United States Patent
Zhang et al.

(10) Patent No.: US 11,360,947 B2
(45) Date of Patent: Jun. 14, 2022

(54) METHOD AND SYSTEM FOR EVALUATING AN OPERATION OF A DISTRIBUTION NETWORK

(71) Applicants: ELECTRIC POWER SCIENCE & RESEARCH INSTITUTE OF STATE GRID TIANJIN ELECTRIC POWER COMPANY, Hebei District Tianjin (CN); STATE GRID TIANJIN ELECTRIC POWER COMPANY, Hebei District Tianjin (CN); STATE GRID CORPORATION OF CHINA, Xicheng District Beijing (CN); NORTH CHINA ELECTRIC POWER UNIVERSITY, Changping District Beijing (CN)

(72) Inventors: Pan Zhang, Tianjin (CN); Menghan Wu, Tianjin (CN); Ning Jiang, Tianjin (CN); Xudong Wang, Tianjin (CN); Guodong Li, Tianjin (CN); Yi Ding, Tianjin (CN); Yan Qi, Tianjin (CN); Yanxin Shi, Tianjin (CN); Xuejun Shang, Tianjin (CN); Wei Fan, Tianjin (CN); Ning Kang, Tianjin (CN); Zhijun Zhang, Tianjin (CN); Jie Zhang, Tianjin (CN); Tao Li, Tianjin (CN)

(73) Assignees: ELECTRIC POWER SCIENCE & RESEARCH INSTITUTE OF STATE GRID TIANJIN ELECTRIC POWER COMPANY, Tianjin (CN); STATE GRID TIANJIN ELECTRIC POWER COMPANY, Tianjin (CN); STATE GRID CORPORATION OF CHINA, Beijing (CN); NORTH CHINA ELECTRIC POWER UNIVERSITY, Beijing (CN)

( * ) Notice: Subject to any disclaimer, the term of this patent is extended or adjusted under 35 U.S.C. 154(b) by 106 days.

(21) Appl. No.: 16/756,028

(22) PCT Filed: Dec. 16, 2019

(86) PCT No.: PCT/CN2019/125603
§ 371 (c)(1),
(2) Date: Apr. 14, 2020

(87) PCT Pub. No.: WO2020/140738
PCT Pub. Date: Jul. 9, 2020

(65) Prior Publication Data
US 2021/0224234 A1 Jul. 22, 2021

(30) Foreign Application Priority Data
Dec. 30, 2018 (CN) .......................... 201811649276.7

(51) Int. Cl.
*G06F 16/18* (2019.01)
*G06F 16/182* (2019.01)
(Continued)

(52) U.S. Cl.
CPC ...... *G06F 16/1824* (2019.01); *G06F 16/9577* (2019.01); *H04L 45/02* (2013.01); *H04L 45/566* (2013.01); *H04L 45/74* (2013.01)

(58) Field of Classification Search
CPC ........................... H04L 63/1425; H04L 45/74
See application file for complete search history.

(56) References Cited

U.S. PATENT DOCUMENTS

2010/0161151 A1   6/2010  Yang et al.
2012/0026900 A1*  2/2012  Chandrasekaran ..........................
                                              H04L 41/0672
                                              370/252

(Continued)

FOREIGN PATENT DOCUMENTS

| CN | 105634821 A | 6/2016 |
| CN | 107767067 A | 3/2018 |
| CN | 109818781 A | 5/2019 |

OTHER PUBLICATIONS

International Search Report for PCT/CN2019/125603 dated Mar. 4, 2020 in Chinese Translation.

*Primary Examiner* — Mohammad S Rostami
(74) *Attorney, Agent, or Firm* — Arentfox Schiff LLP

(57) ABSTRACT

The present application relates to a method for evaluating an operation of a distribution network based on data capture and Spark. The method includes: acquiring a packet from a (Continued)

terminal, and mirroring the packet through a mirroring port of a switch to acquire a mirror packet of the packet; analyzing the mirror packet, acquiring a 101/104 protocol packet, and storing the 101/104 protocol packet into an HDFS; acquiring the 101/104 protocol packet from the HDFS, parsing the 101/104 protocol packet on a Spark platform to acquire a parameter in the 101/104 protocol packet, and analyzing and processing the parameter to obtain a key indicator for evaluating the operation of the distribution network; and displaying the key indicator through a web page.

5 Claims, 3 Drawing Sheets

(51) Int. Cl.
*G06F 16/957* (2019.01)
*H04L 45/02* (2022.01)
*H04L 45/00* (2022.01)
*H04L 45/74* (2022.01)

(56) References Cited

U.S. PATENT DOCUMENTS

| | | | | |
|---|---|---|---|---|
| 2012/0300777 | A1* | 11/2012 | Chandrasekaran | H04L 69/22 370/392 |
| 2013/0282144 | A1* | 10/2013 | Cabello Medina | H04L 65/1069 700/9 |
| 2014/0301215 | A1* | 10/2014 | Somoskoi | H04L 43/0852 370/252 |
| 2014/0376547 | A1* | 12/2014 | Mahamuni | H04L 69/08 370/389 |
| 2016/0149954 | A1* | 5/2016 | Rodniansky | H04L 63/166 726/1 |
| 2016/0269482 | A1* | 9/2016 | Jamjoom | H04L 45/64 |
| 2020/0204574 | A1* | 6/2020 | Christian | G06K 9/6218 |
| 2021/0083480 | A1* | 3/2021 | Qiao | H02J 3/1821 |

\* cited by examiner

METHOD AND SYSTEM FOR EVALUATING AN OPERATION OF A DISTRIBUTION NETWORK

This application claims priority to Chinese patent application No. 201811649276.7 filed on Dec. 30, 2018, disclosure of which is incorporated herein by reference in its entirety.

TECHNICAL FIELD

The present application belongs to the field of power system automation technologies, and relates to a method and system for evaluating a key indicator for an operation of a distribution network, for example, a method and system for evaluating the operation of the distribution network based on data capture and Spark.

BACKGROUND

Currently, in the related art, a real-time property and authenticity of acquired distribution network data cannot be guaranteed; meanwhile, a performance bottleneck exists in massive data processing, a key indicator for an operation of a distribution network cannot be calculated in real time, and an appropriate evaluation indicator is not used for evaluating the operation of the distribution network.

SUMMARY

The present application provides a method and system for evaluating an operation of a distribution network based on data capture and Spark, which has a reasonable design, a low cost, high reliability and a strong real-time property.

The present application provides a method for evaluating an operation of a distribution network based on data capture and Spark. The method includes steps described below. A packet from a terminal is acquired, and the packet is mirrored through a mirroring port of a switch to acquire a mirror packet of the packet. The mirror packet is analyzed, a 101/104 protocol packet is acquired, and the 101/104 protocol packet is stored into a Hadoop distributed file system (HDFS). The 101/104 protocol packet is acquired from the HDFS, the 101/104 protocol packet is parsed on a Spark platform to acquire a parameter in the 101/104 protocol packet, and the parameter is analyzed and processed to obtain a key indicator for evaluating the operation of the distribution network. The key indicator is displayed through a web page.

In an embodiment, the step of acquiring the packet from the terminal and mirroring the packet through the mirroring port of the switch to acquire the mirror packet of the packet includes steps described below. The packet from the terminal is acquired, the mirroring port is set in the switch, and the packet is mirrored through the mirroring port to acquire the mirror packet of the packet.

In an embodiment, the step of analyzing the mirror packet, acquiring the 101/104 protocol packet, and storing the 101/104 protocol packet into the HDFS includes steps described below. The mirror packet is acquired, and circular capture is performed on the mirror packet based on a Libpcap packet capture library to acquire the 101/104 protocol packet. The 101/104 protocol packet is stored into the HDFS.

In an embodiment, the step of acquiring the 101/104 protocol packet from the HDFS, parsing the 101/104 protocol packet on the Spark platform to acquire the parameter in the 101/104 protocol packet, and analyzing and processing the parameter to obtain the key indicator for evaluating the operation of the distribution network includes steps described below. The 101/104 protocol packet is acquired from the HDFS, the 101/104 protocol packet is parsed based on the Spark platform, and whether 101/104 protocol content is normal is determined. Whether a protocol format of a 101/104 protocol is a variable frame format or a fixed frame format is determined based on a determination result that the 101/104 protocol content is normal; where for a 101 protocol, a variable frame starts with characters 0x68 and ends with characters 0x16, and a fixed frame starts with characters 0x01 and ends with the characters 0x16. In a case where the protocol format is the variable frame format, the 101/104 protocol packet is parsed to acquire the parameter contained in the 101/104 protocol packet, where the parameter includes a telemetry parameter, a tele-signaling parameter and a tele-control parameter. In a case where the protocol format is the fixed frame format, the 101/104 protocol packet is parsed to acquire the parameter contained in the 101/104 protocol packet, where the parameter includes the telemetry parameter, the tele-signaling parameter and the tele-control parameter. The parameter is analyzed and processed. The key indicator for the operation of the distribution network is calculated according to the processed parameter based on the Spark platform.

In an embodiment, the step of calculating, according to the processed parameter, the key indicator for the operation of the distribution network based on the Spark platform includes steps described below.

A feeder automation (FA) starting rate is calculated:

$$FA \text{ starting rate} = \frac{FA \text{ starting times}}{\text{Number of faults}},$$

where the number of faults refers to a number of faults of a feeder, and the FA starting times refer to a number of times a feeder automation system normally starts after the faults.

An FA correct rate is calculated:

$$FA \text{ correct rate} = \frac{FA \text{ correct times}}{FA \text{ starting times}},$$

where the FA correct times refer to a number of times a correct action is performed after FA starting to position and isolate a fault and restore a power supply of a non-fault area.

An FA coverage rate is calculated:

$$FA \text{ coverage rate} = \frac{\text{Number of terminal devices with } FA \text{ in a distribution on network area}}{\text{Total number of terminal devices in the distribution network area}},$$

where the number of terminal devices with the FA in the distribution network area refers to a number of terminal devices provided with the FA in the area, and the total number of terminal devices in the distribution network area refers to the total number of terminal devices in the distribution network area.

A master station online rate is calculated:

$$\text{Master station online rate} = \frac{(\text{Full calendar time} - \text{master station outage time})}{\text{Full calendar time}},$$

where the full calendar time refers to a time span from a moment when a master station starts to a certain moment, and the master station outage time refers to a sum of multiple time periods within which the master station stops operating within the full calendar time.

A tele-signaling action correct rate is calculated:

$$\text{Tele-signaling action correct rate} = \frac{\text{Correct action times}}{(\text{Correct action times} + \text{rejecting action and misaction times})},$$

where the correct action times refer to a number of times tele-signaling is performed correctly, and the rejecting action and misaction times refer to a sum of misactions and rejecting actions.

A telemetry collection correct rate is calculated:

$$\text{Telemetry collection correct rate} = \frac{\text{Number of correct telemetry collections}}{\text{Total number of telemetry collections}},$$

where the number of correct telemetry collections refers to a number of times correct data is collected in telemetry, and the total number of telemetry collections refers to a total number of times a telemetry collection is performed.

A tele-control usage rate is calculated:

$$\text{Tele-control usage rate} = \frac{\text{Number of practical teleccommands}}{\text{Total number of available tele-controls}},$$

where the total number of available tele-controls refers to a total number of times tele-controls are implementable, and the number of practical tele-controls refers to a total number of times the tele-controls are practically performed.

A tele-control correct rate is calculated:

$$\text{Tele-control correct rate} = \frac{\text{Number of tele-control successes}}{\text{Number of practical tele-controls}},$$

where the number of tele-control successes refers to a number of times the tele-controls succeed, and the number of practical tele-controls refers to the total number of times the tele-controls are practically performed.

A terminal online rate is calculated:

$$\text{Terminal online rate} = \frac{\text{Online duration of a currently used terminal device}}{\text{Supposed online duration of all terminals in use}},$$

where the online duration of the currently used terminal device refers to an online running duration of a currently online terminal device, and the supposed online duration of all terminals in use refers to an online duration of all terminal devices supposed to be online.

A system for evaluating an operation of a distribution network based on data capture and Spark, including a terminal, a switch, a packet processing server and a Spark processing platform. The terminal is connected to the switch and configured to collect a packet and output the collected packet to the switch. The switch is connected to the packet processing server and configured to receive the packet collected by the terminal, mirror the packet through a mirroring port to acquire a mirror packet of the packet, and forward the mirror packet to the packet processing server. The packet processing server is connected to the Spark processing platform and configured to acquire a 101/104 protocol packet from the mirror packet, and store the 101/104 protocol packet into an HDFS. The Spark processing platform is configured to acquire the 101/104 protocol packet from the HDFS, and parse the 101/104 protocol packet to obtain a key indicator for evaluating the operation of the distribution network.

In an embodiment, the Spark processing platform includes a packet acquisition unit, a protocol analysis unit, a protocol format determination unit, a parameter processing unit and an indicator calculation unit. The packet acquisition unit is configured to acquire the 101/104 protocol packet from the HDFS. The protocol analysis unit is configured to parse the 101/104 protocol packet, and determine whether 101/104 protocol content is normal. The protocol format determination unit is configured to determine, based on a determination result that the 101/104 protocol content is normal, a protocol format of a 101/104 protocol, and acquire a corresponding parameter according to the protocol format. The parameter processing unit is configured to process, according to a topological structure and an operation principle of an electric power system, the acquired parameter. The indicator calculation unit is configured to calculate the key indicator for the operation of the distribution network according to the processed parameter.

In the present application, real-time and accurate an operation of a distribution network data can be acquired; when a large number of packets need to be processed, the packets are stored in the Hadoop distributed file system (HDFS) suitable for storing massive data; and through a high-performance Spark calculation framework in conjunction with an appropriate evaluation indicator, the key indicator for the operation of the distribution network can be calculated, the operation of the distribution network is evaluated, scheduling and control of a distribution network are optimized in real time, thereby an automation level of the distribution network is improved.

The present application provides the method and system for evaluating an operation of a distribution network based on the data capture and the Spark. The present application relates to multiple technologies of packet mirroring, packet filtering, HDFS storage, a Spark data analysis, evaluations and calculations, and the like, and the packet is acquired from the terminal, so that the data authenticity can be ensured. Massive packets can be parsed and calculated in conjunction with the Spark platform, which has a good real-time property.

The method and system for evaluating an operation of a distribution network based on the data capture and the Spark in the present application implement function and performance operation evaluations of a power distribution automation system by calculating key indicators including the master station online rate, an automation coverage rate, the tele-signaling operation correct rate, the tele-control correct rate, the tele-control usage rate, the telemetry collection correct rate, the FA starting rate, the FA correct rate, the terminal online rate and the like, thereby ensuring reliable operation and effective utilization of the power distribution automation system in a power distribution production and scheduling service process.

The improvement in the present application is performed under the condition of network deployment in the related art, thereby the improvement is convenient to perform and has a low cost.

DETAILED DESCRIPTION

Embodiments of the present application will be described below in detail in conjunction with the drawings.

Figure 1:
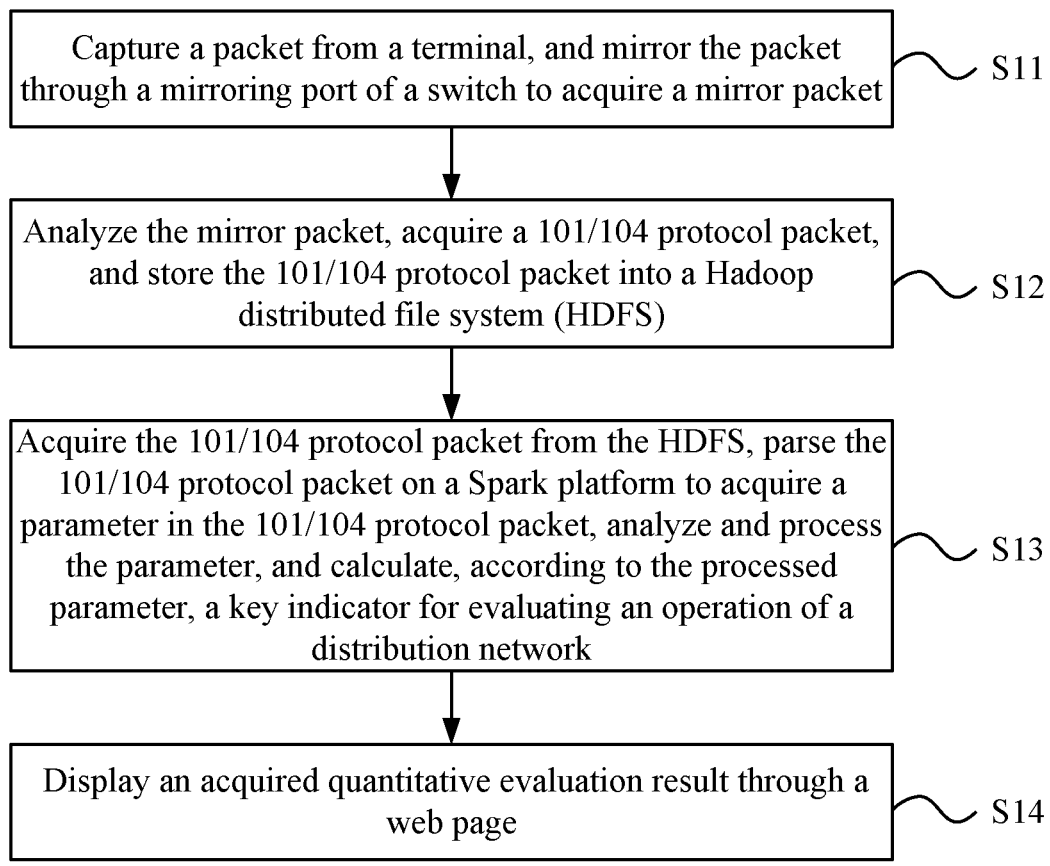
FIG. 1 is a processing flowchart of the present application.

A method for evaluating an operation of a distribution network based on data capture and Spark, as shown in FIG. 1, includes step S11 to step S14.

In step S11, a packet from a terminal is captured, and the packet is mirrored through a mirroring port of a switch to acquire a mirror packet.

In this embodiment, step S11 includes a step described below. The packet from the terminal is acquired, the mirroring port is set in the switch, and the packet is mirrored through the mirroring port to acquire the mirror packet of the packet.

In step S12, the mirror packet in step S11 is analyzed, a 101/104 protocol packet is acquired, and the 101/104 protocol packet is stored into a Hadoop distributed file system (HDFS).

Figure 2:
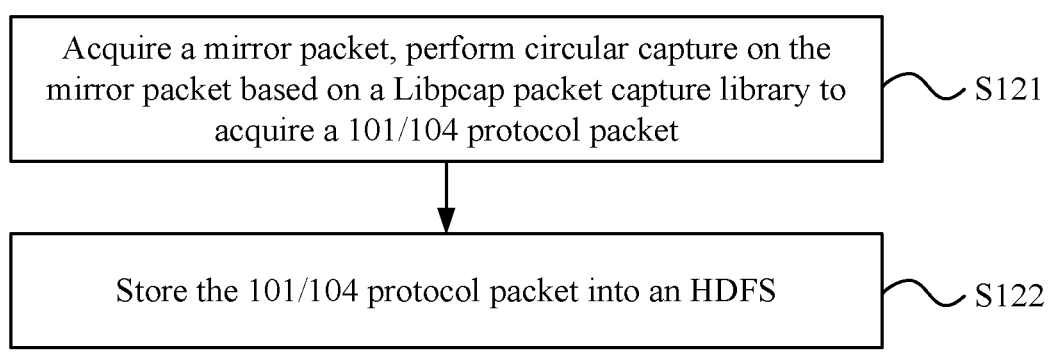
FIG. 2 is a processing flowchart of a mirror packet of the present application.

As shown in FIG. 2, step S12 includes step S121 and step S122.

In step S121, the mirror packet is acquired, and circular capture is performed on the mirror packet based on a packet capture library (libpcap) to acquire the 101/104 protocol packet.

In step S122, the 101/104 protocol packet is stored into the HDFS.

In this embodiment, step S12 includes in a packet processing server, filtering the packet by using the packet capture library (libpcap) to acquire the 101/104 protocol packet, and storing the 101/104 protocol packet into the HDFS.

Figure 4:
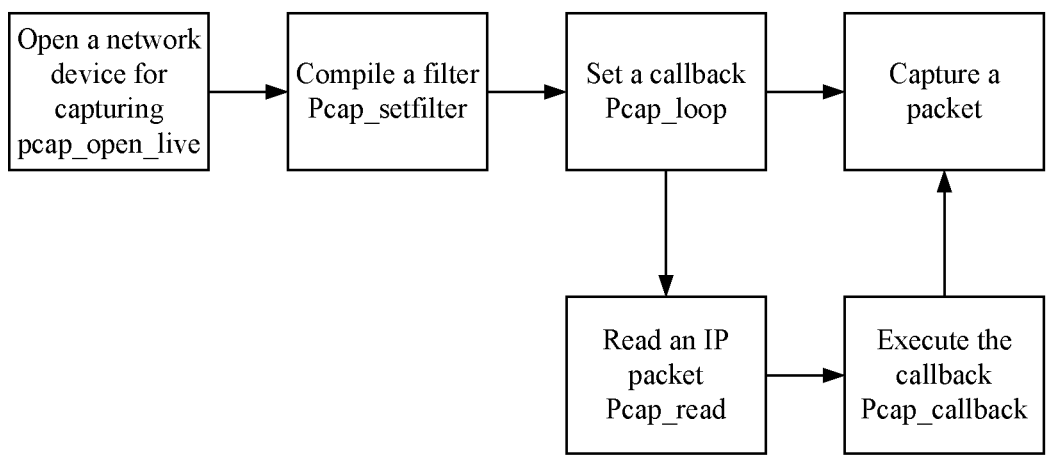
FIG. 4 is a processing flowchart of data capture of the present application.

A method for filtering the packet in step S121 is shown in FIG. 4.

Firstly, a network processor for packet capture is opened through pcap_open_live, and a data packet capture description word for capturing a network data packet is obtained. A data filter is set through pcap_setfilter to filter the needed 101/104 packet, where the filter is an American standard code for information interchange (ASCII) character string including a filter expression, which can filter various types of packets according to requirements. A callback is set through pcap_loop to capture a data packet, an internet protocol (IP) packet is read through pcap_read as a determination condition for starting callback execution through pace callback, and the circular capture is performed on the packet to filter out the 101/104 protocol packet.

In step S13, the 101/104 protocol packet is acquired from the HDFS, the 101/104 protocol packet is parsed on a Spark platform to acquire a parameter in the 101/104 protocol packet, the parameter is analyzed and processed, and a key indicator for evaluating the operation of the distribution network is calculated according to the processed parameter.

Figure 3:
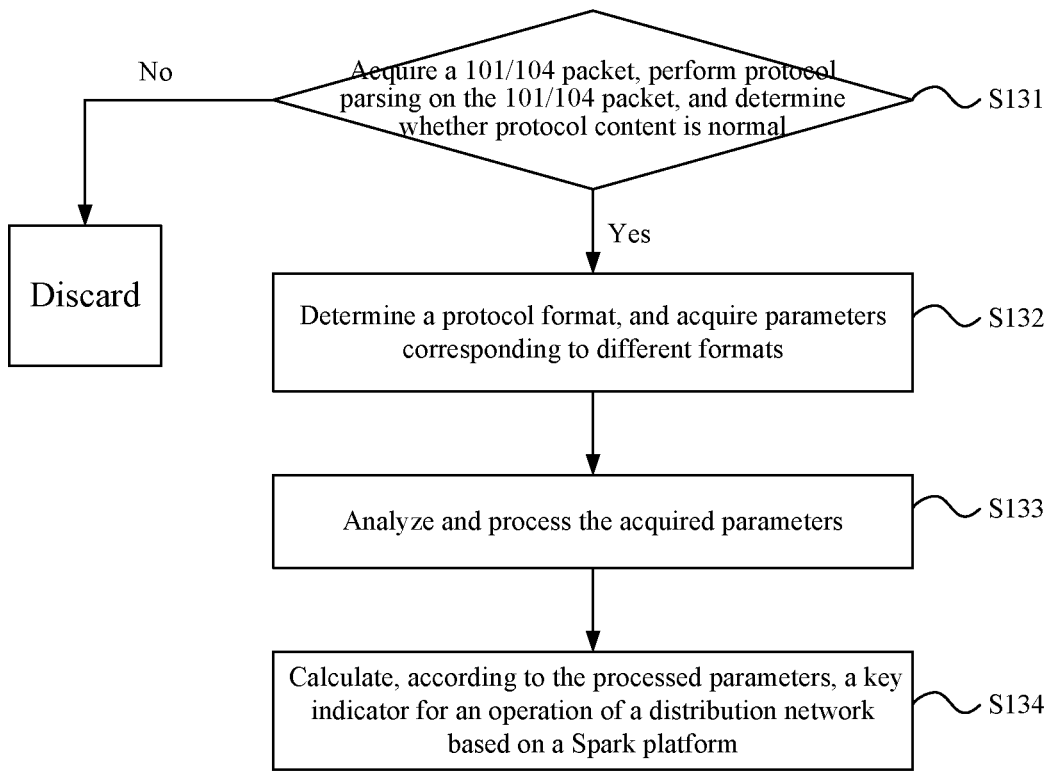
FIG. 3 is a processing flowchart of a Spark platform of the present application.

As shown in FIG. 3, step S13 includes steps S131 to S134.

In step S131, the 101/104 protocol packet is acquired from the HDFS, protocol parsing is performed on the 101/104 protocol packet based on the Spark platform, and whether 101/104 protocol content is normal is determined. If the 101/104 protocol content is normal, step S132 is performed, otherwise the packet is discarded.

In step S132, based on a determination result that the 101/104 protocol content is normal, it is determined whether a protocol format of a 101/104 protocol is a variable frame format or a fixed frame format, where for a 101 protocol, a variable frame starts with characters 0x68 and ends with characters 0x16, and a fixed frame starts with characters 0x01 and ends with the characters 0x16.

For the variable frame format, the 101/104 protocol packet is parsed to acquire the parameter contained in the 101/104 protocol packet, where the parameter includes a telemetry parameter, a tele-signaling parameter, a tele-control parameter and the like.

For the fixed frame format, the 101/104 protocol packet is parsed to acquire the parameter contained in the 101/104 protocol packet, where the parameter includes the telemetry parameter, the tele-signaling parameter, the tele-control parameter and the like.

In step S133, the acquired parameter is analyzed and processed.

In step S134, according to the processed parameter, the key indicator for the operation of the distribution network is calculated based on the Spark platform.

In this embodiment, a specific method for performing protocol parsing on the packet based on the Spark platform in step S13 is shown in FIG. 3. A Spark processing platform parses the packet mainly by reading the packet stored in the HDFS, and a detailed processing process is described below. After the packet is acquired, the packet is parsed, different packet types are identified according to a protocol, and it is firstly determined whether a protocol type is the 101 protocol or the 104 protocol. Whether the protocol is a normal protocol is determined on this basis, and if protocol content is false, the packet is directly discarded; if the protocol is correct, it is determined whether a protocol format is the fixed frame format or the variable frame format. For the 101 protocol, the fixed frame starts with the characters 0x01 and ends with the characters 0x16, and the variable frame starts with the characters 0x68 and ends with the characters 0x16. For the fixed frame format, determination and control are performed, and multiple parameters in the packet are extracted, where the parameters include the telemetry parameter, the tele-signaling parameter, the tele-control parameter and the like. For the variable frame format, the determination control is performed, and the parameters in the packet are extracted, where the parameters include the telemetry parameter, the tele-signaling parameter, the tele-control parameter and the like. The parameters in the packet can be acquired after the packet is parsed, and the key indicator for the operation of the distribution network is calculated in conjunction with the processed parameter.

In step S134, the step of calculating, according to the processed parameter, the key indicator for the operation of the distribution network based on the Spark platform includes steps described below.

An FA starting rate is calculated, where the FA starting rate refers to a proportion of the number of times FA can start according to fault information to the number of faults after a certain feeder has faults, and a calculation formula is described as follows:

$$FA \text{ starting rate} = \frac{FA \text{ starting times } B}{\text{Number } A \text{ of faults}},$$

where the number A of faults refers to a number of faults of the feeder.

Within a selected time range, a comprehensive evaluation is performed according to a trip action of an outlet circuit breaker and an action of a relay protection device. When information in a circuit breaker state bit in sequence object event (SOE) information in the packet changes from an on state to an off state, and meanwhile a relay protection signal changes from the off state to the on state, it is determined that the feeder has one accident. A total number A of faults is counted through an optional time interval.

The FA starting times B refer to a number of times a feeder automation system normally starts after the faults.

The determination of the FA starting times is counted through a change of a tele-control signal. Within a time period of T+ΔT from the moment when the accident occurs, when a tele-control instruction is transmitted once and the off state changes to the on state, it is determined that the FA starts, and the total number of FA starting times is counted according to the selected time interval.

An FA correct rate is calculated, where the FA correct rate refers to whether a correct action can be performed after FA starting to position and isolate a fault area and restore a power supply of a non-fault area after the certain feeder has the fault, and a calculation formula is described as follows:

$$FA \text{ correct rate} = \frac{FA \text{ correct times } C}{FA \text{ starting times } B},$$

where the FA correct times C refer to after FA starting, a number of times the correct action is performed to position and isolate the fault and restore the power supply of the non-fault area.

Within an optional time range, when the tele-control instruction changes its state, a tele-signaling signal in the packet is acquired, and the FA correct action times may be evaluated according to an FA correctness evaluation method. According to the selected time interval, the action is determined to be correct after the FA starting, the FA correct times is increased by one, and thereby the total FA correct times are counted.

An FA coverage rate is calculated:

$$FA \text{ coverage rate} = \frac{\text{Number } D \text{ of terminal devices with } FA}{\text{Total number } E \text{ of terminal devices}} ,$$
$$\text{in a distribution network area}$$
$$\text{in the distribution network area}$$

where the number D of terminal devices with the FA in the distribution network area refers to in the area, a number of terminal devices provided with the FA, and the total number E of terminal devices in the distribution network area refers to the total number of terminal devices in the distribution network area.

A master station online rate is calculated, where the master station online rate refers to a proportion of online running time of a master station from a moment when the system starts to a certain moment, and a calculation formula is described as follows:

$$\text{Master station online rate} = \frac{(\text{Full calendar time } F - \text{master station outage time } G)}{\text{Full calendar time } F},$$

where the full calendar time F refers to a time span from a moment when the master station starts to the certain moment, and the master station outage time G refers to a sum of multiple time periods within which the master station is stopped within the full calendar time. A master station outage is determined through a transceiving condition of the packet.

A tele-signaling action correct rate is calculated to represent a correct degree of tele-signaling actions, and a calculation formula is described as follows:

$$\text{Tele-signaling action correct rate} = \frac{\text{Correct action times } H}{(\text{Correct action times } H + \text{rejecting action and misaction times } I)},$$

where the correct action times H refer to a number of times tele-signaling is performed correctly, and the rejecting action and misaction times I refer to a sum of misactions and rejecting actions in tele-signaling.

According to off and on information of a switch state and sequence object event (SOE) information of the tele-signaling, the number of matching between tele-signaling state changes and tele-signaling SOEs and the number of tele-signaling state changes can be calculated, thereby evaluating a tele-signaling correct rate.

A telemetry collection correct rate is calculated, where the telemetry collection correct rate reflects a correct degree of telemetry collection data, and a calculation formula is described as follows:

$$\text{Telemetry collection correct rate} = \frac{\text{Number } J \text{ of correct telemetry collections}}{\text{Total number } K \text{ of telemetry collections}},$$

where the number J of correct telemetry collections refers to a number of times correct data is collected in telemetry, and the total number K of telemetry collections refers to a total number of times a telemetry collection is performed.

A tele-control usage rate is calculated, where the tele-control usage rate refers to an overall tele-control control usage condition, and a calculation formula is described as follows:

$$\text{Tele-control usage rate} = \frac{\text{Number } L \text{ of practical teleccommands}}{\text{Total number } M \text{ of available tele-controls}},$$

where the total number M of available tele-controls refers to a total number of times tele-controls are implementable.

According to the off and on information of the switch state, the number of state changes of telemetry, tele-signaling and tele-control (three remote) switches can be calculated, and the tele-control usage rate is evaluated in conjunction with the tele-control information described above.

A tele-control correct rate is calculated, where the tele-control correct rate refers to a correct degree of the tele-controls in use, and a calculation formula is described as follows:

$$\text{Tele-control correct rate} = \frac{\text{Number } N \text{ of tele-control successes}}{\text{Number } L \text{ of practical tele-controls}},$$

where the number N of tele-control successes refers to a number of times the tele-controls succeed, and the number L of practical tele-controls refers to the total number of times the tele-controls are practically performed.

According to specific information, for performing tele-controls on three remote switch devices, which includes tele-control presetting information, tele-control distribution information and tele-control result return information, the number of tele-control successes and the total number of tele-controls of the three remote switches can be calculated, and an evaluation and an analysis of a tele-control success rate of the distribution network are performed according to the information.

A terminal online rate is calculated, where the terminal online rate refers to a ratio of an online duration of a currently used terminal device to a supposed online duration of all terminals in use, and a calculation formula is described as follows:

$$\text{Terminal online rate} = \frac{\text{Online duration } O \text{ of the currently used terminal device}}{\text{Supposed online duration } P \text{ of all terminals in use}},$$

where the online duration O of the currently used terminal device refers to an online running duration of a currently online terminal device, and the supposed online duration P of all terminals in use refers to an online duration of all terminal devices supposed to be online.

According to the recorded operation and disconnection of the terminal and time scale information, an online duration and an offline duration of the terminal can be calculated, and the terminal online rate of the distribution network is evaluated in conjunction with the information.

In step S14, an acquired quantitative evaluation result is displayed through a web page.

Figure 5:
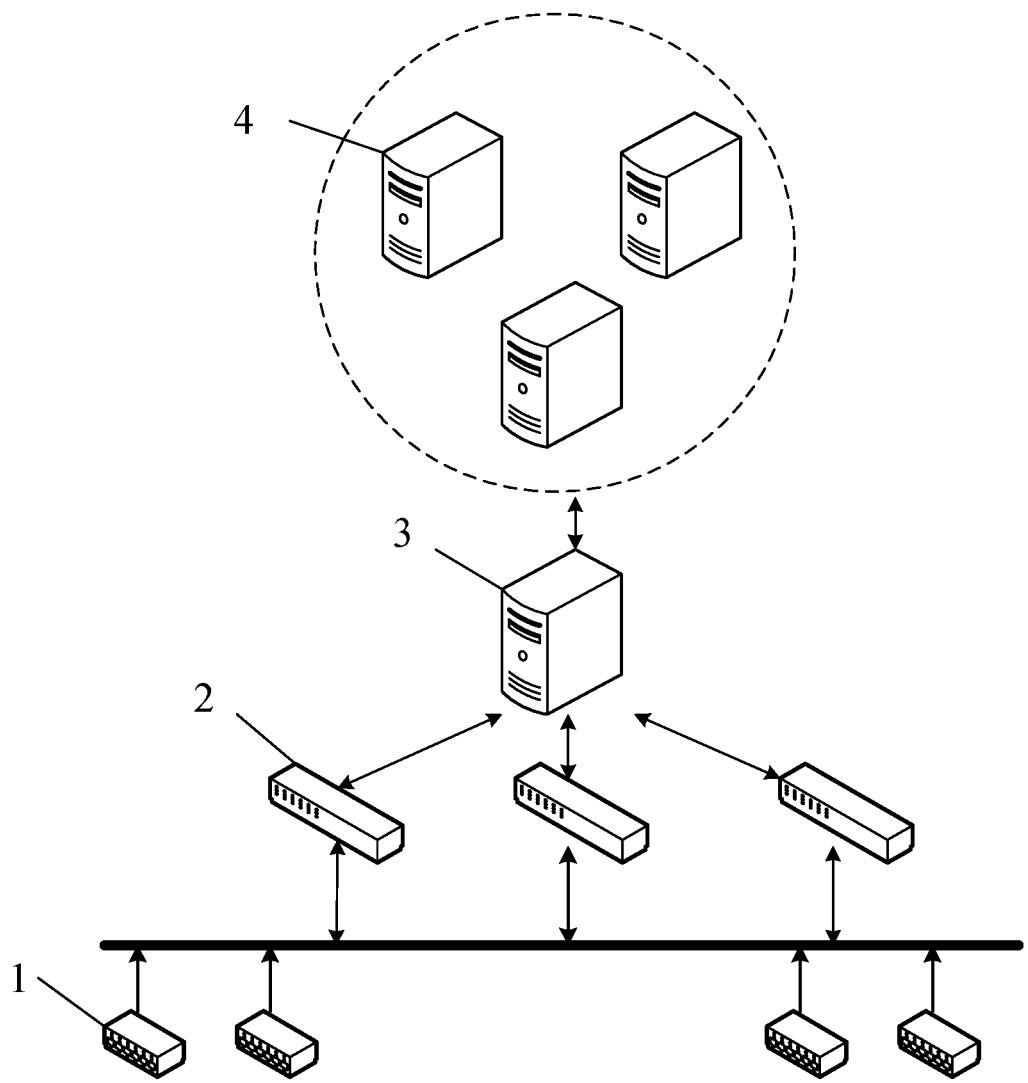
FIG. 5 is an overall architectural diagram of a system of the present application.

The present application provides a system for evaluating an operation of a distribution network based on data capture and Spark. As shown in FIG. 5, the system includes a terminal 1, a switch 2, a packet processing server 3 and a Spark processing platform 4.

The terminal is connected to the switch and configured to collect a packet and output the collected packet to the switch.

The switch is connected to the packet processing server and configured to receive the packet collected by the terminal, mirror the packet, and forward a mirror packet to the packet processing server after the packet is mirrored, where mirroring refers to copying traffic from a certain port of the switch to another port (a mirroring port).

The packet processing server 3 is connected to the Spark processing platform 4 and configured to store the packet into an HDFS after filtering the packet.

The Spark processing platform acquires the packet from the HDFS, and is configured to parse the acquired packet and calculate a key indicator for the operation of the distribution network.

Figure 6:
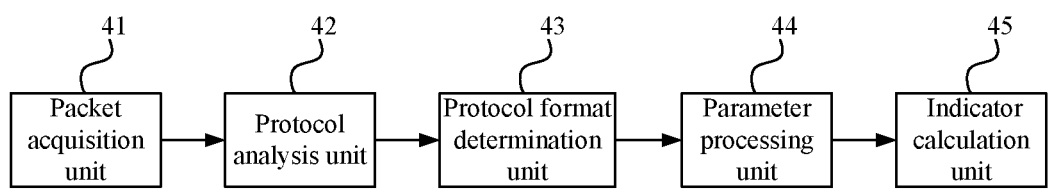
FIG. 6 is a diagram illustrating function units and an execution process of a Spark processing platform of the present application.

The Spark processing platform includes a packet acquisition unit 41, a protocol analysis unit 42, a protocol format determination unit 43, a parameter processing unit 44 and an indicator calculation unit 45. The packet acquisition unit 41 is configured to acquire the packet from the HDFS. The protocol analysis unit 42 is configured to parse the acquired packet, determine whether protocol content is normal, perform the next step if the protocol content is normal, and otherwise discard the packet. The protocol format determination unit 43 is configured to determine a protocol format, and acquire a corresponding parameter according to the protocol format. The parameter processing unit 44 is configured to process an indicator parameter, where the parameter is processed according to a topological structure and an operation principle of an electric power system. The indicator calculation unit 45 is configured to calculate a quantitative evaluation result of the indicator in conjunction with an evaluation method and the processed parameter. A structural diagram of the Spark processing platform is shown in FIG. 6.

In this embodiment, one switch 2 corresponds to a plurality of terminals 1, and can simultaneously parse packets from the plurality of terminals 1. The system is simple in structure and saves costs.

What is claimed is:

1. A method for evaluating an operation of a distribution network, comprising:
   acquiring, by a switch, a packet from a terminal, and mirroring, by the switch, the packet through a mirroring port of the switch to acquire a mirror packet of the packet;
   analyzing, by a packet processing server, the mirror packet, acquiring, by the packet processing server, a 101/104 protocol packet, and storing, by the packet processing server, the 101/104 protocol packet into a Hadoop distributed file system (HDFS);

acquiring, by a Spark processing platform, the 101/104 protocol packet from the HDFS, parsing, by the Spark processing platform, the 101/104 protocol packet on the Spark processing platform to acquire a parameter in the 101/104 protocol packet, and analyzing and processing, by the Spark processing platform, the parameter to obtain a key indicator for evaluating the operation of the distribution network; and displaying, by the Spark processing platform, the key indicator through a web page;

wherein acquiring, by the Spark processing platform, the 101/104 protocol packet from the HDFS, parsing, by the Spark processing platform, the 101/104 protocol packet on the Spark platform to acquire the parameter in the 101/104 protocol packet, and analyzing and processing, by the Spark processing platform, the parameter to obtain the key indicator for evaluating the operation of the distribution network comprises:

acquiring, by the Spark processing platform, the 101/104 protocol packet from the HDFS, parsing, by the Spark processing platform, the 101/104 protocol packet, and determining, by the Spark processing platform, whether 101/104 protocol content is normal;

determining, by the Spark processing platform, based on a determination result that the 101/104 protocol content is normal, whether a protocol format of a 101/104 protocol is a variable frame format or a fixed frame format, wherein for a 101 protocol, a variable frame starts with characters 0×68 and ends with characters 0×16, and a fixed frame starts with characters 0×01 and ends with characters 0×16; and in a case where the protocol format is the variable frame format, parsing, by the Spark processing platform, the 101/104 protocol packet to acquire the parameter contained in the 101/104 protocol packet, wherein the parameter comprises a telemetry parameter, a tele-signaling parameter and a tele-control parameter, or in a case where the protocol format is the fixed frame format, parsing, by the Spark processing platform, the 101/104 protocol packet to acquire the parameter contained in the 101/104 protocol packet, wherein the parameter comprises the telemetry parameter, the tele-signaling parameter and the tele-control parameter;

analyzing and processing, by the Spark processing platform, the parameter; and calculating by the Spark processing platform, according to the processed parameter, the key indicator for the operation of the distribution network based on the Spark processing platform.

2. The method of claim 1, wherein acquiring, by the switch, the packet from the terminal, and mirroring, by the switch, the packet through the mirroring port of the switch to acquire the mirror packet of the packet comprises:

acquiring, by the switch, the packet from the terminal, setting, by the switch, the mirroring port in the switch, and mirroring, by the switch, the packet through the mirroring port to acquire the mirror packet of the packet.

3. The method of claim 1, wherein analyzing, by the packet processing server, the mirror packet, acquiring, by the packet processing server, the 101/104 protocol packet, and storing, by the packet processing server, the 101/104 protocol packet into the HDFS comprises:

acquiring, by the packet processing server, the mirror packet, and performing, by the packet processing server, circular capture on the mirror packet based on a Libpcap packet capture library to acquire the 101/104 protocol packet; and storing, by the packet processing server, the 101/104 protocol packet into the HDFS.

4. The method of claim 1, wherein calculating, by the Spark processing platform, according to the processed parameter, the key indicator for the operation of the distribution network based on the Spark processing platform comprises:

calculating, by the Spark processing platform, a feeder automation (FA) starting rate:

$$FA \text{ starting rate} = \frac{FA \text{ starting times}}{\text{Number of faults}},$$

where the number of faults refers to a number of faults of a feeder, and the FA starting times refer to a number of times a feeder automation system normally starts after the faults;

calculating, by the Spark processing platform, an FA correct rate:

$$FA \text{ correct rate} = \frac{FA \text{ correct times}}{FA \text{ starting times}},$$

where the FA correct times refer to after FA starting, a number of times a correct action is performed to position and isolate a fault and restore a power supply of a non-fault area;

calculating, by the Spark processing platform, an FA coverage rate:

$$FA \text{ coverage rate} = \frac{\text{Number of terminal devices with } FA \text{ in a distribution network area}}{\text{Total number of terminal devices in the distribution network area}},$$

where the number of terminal devices with the FA in the distribution network area refers to a number of terminal devices provided with the FA in the area, and the total number of terminal devices in the distribution network area refers to the total number of terminal devices in the distribution network area;

calculating, by the Spark processing platform, a master station online rate:

$$\text{Master station online rate} = \frac{(\text{Full calendar time} - \text{master station outage time})}{\text{Full calendar time}},$$

where the full calendar time refers to a time span from a moment when a master station starts to a certain moment, and the master station outage time refers to a sum of multiple time periods within which the master station is stopped within the full calendar time;

calculating, by the Spark processing platform, a tele-signaling action correct rate:

$$\text{Tele-signaling action correct rate} = \frac{\text{Correct action times}}{(\text{Correct action times} + \text{rejecting action and misaction times})},$$

where the tele-signaling correct action times refer to a number of times tele-signaling is performed correctly, and the rejecting action and misaction times refer to a sum of times of misactions and rejecting actions in tele-signaling;

calculating, by the Spark processing platform, a telemetry collection correct rate:

$$\text{Telemetry collection correct rate} = \frac{\text{Number of correct telemetry collections}}{\text{Total number of telemetry collections}},$$

where the number of correct telemetry collections refers to a number of correct data collected in telemetry, and the total number of telemetry collections refers to a total number of times a telemetry collection is performed;

calculating, by the Spark processing platform, a tele-control usage rate:

$$\text{Tele-control usage rate} = \frac{\text{Numbr of practical tele-commands}}{\text{Total number of available tele-controls}},$$

where the total number of available tele-controls refers to a total number of times tele-controls are implementable, and the number of practical tele-controls refers to a total number of times the tele-controls are practically performed;

calculating, by the Spark processing platform, a tele-control correct rate:

$$\text{Tele-control correct rate} = \frac{\text{Number of tele-control successes}}{\text{Number of practical tele-controls}},$$

where the number of tele-control successes refers to a number of times the tele-controls succeed, and the number of practical tele-controls refers to the total number of times the tele-controls are practically performed; and calculating, by the Spark processing platform, a terminal online rate:

$$\text{Terminal online rate} = \frac{\text{Online duration of a currently used terminal device}}{\text{Supposed online duration P of all terminals in use}},$$

where the online duration of the currently used terminal device refers to an online running duration of a currently online terminal device, and the supposed online duration of all terminals in use refers to an online duration of all terminal devices supposed to be online.

5. A system for evaluating an operation of a distribution network, comprising a terminal, a switch, a packet processing server and a Spark processing platform;
wherein
the terminal is connected to the switch and configured to collect a packet and output the collected packet to the switch;
the switch is connected to the packet processing server and configured to receive the packet collected by the terminal, mirror the packet through a mirroring port to acquire a mirror packet of the packet, and forward the mirror packet to the packet processing server;
the packet processing server is connected to the Spark processing platform and configured to acquire a 101/104 protocol packet from the mirror packet, and store the 101/104 protocol packet into a Hadoop distributed file system (HDFS); and
the Spark processing platform is configured to acquire the 101/104 protocol packet from the HDFS, and parse the 101/104 protocol packet to obtain a key indicator for evaluating the operation of the distribution network;
wherein the Spark processing platform comprises:
a packet acquisition unit, which is configured to acquire the 101/104 protocol packet from the HDFS;
a protocol analysis unit, which is configured to parse the 101/104 protocol packet, and determine whether 101/104 protocol content is normal;
a protocol format determination unit, which is configured to determine, based on a determination result that the 101/104 protocol content is normal, whether a protocol format of a 101/104 protocol is a variable frame format or a fixed frame format, wherein for a 101 protocol, a variable frame starts with characters 0×68 and ends with characters 0×16, and a fixed frame starts with characters 0–01 and ends with characters 0×16; and in a case where the protocol format is the variable frame format, parse the 101/104 protocol packet to acquire the parameter contained in the 101/104 protocol packet, wherein the parameter comprises a telemetry parameter, a tele-signaling parameter and a tele-control parameter, or in a case where the protocol format is the fixed frame format, parse the 101/104 protocol packet to acquire the parameter contained in the 101/104 protocol packet, wherein the parameter comprises the telemetry parameter, the tele-signaling arameter and the tele-control arameter
a parameter processing unit, which is configured to process, according to a topological structure and an operation principle of an electric power system, the acquired parameter; and
an indicator calculation unit, which is configured to calculate the key indicator for the operation of the distribution network according to the processed parameter.

* * * * *